(12) United States Patent
Furuhashi (10) Patent No.: US 6,268,958 B1
(45) Date of Patent: *Jul. 31, 2001

(54) MICROSCOPE HAVING ADJUSTABLE OBJECTIVE LENS HOLDER

(75) Inventor: Hidehiko Furuhashi, Fujisawa (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,342

(22) Filed: Aug. 26, 1998

(30) Foreign Application Priority Data

Sep. 26, 1997 (JP) .................................................... 9-261365
Apr. 8, 1998 (JP) .................................................. 10-095520

(51) Int. Cl.⁷ .............................. G02B 21/02; G02B 7/14
(52) U.S. Cl. ......................... 359/381; 359/379; 359/821
(58) Field of Search .................................. 359/381, 821, 359/379, 823, 825

(56) References Cited

U.S. PATENT DOCUMENTS

| | | | |
|---|---|---|---|
| 1,818,974 | * 8/1931 | Englemann | 359/381 |
| 2,133,509 | * 10/1938 | Hall et al. | 359/381 |
| 2,484,972 | * 10/1949 | Turrettini | 359/381 |
| 3,963,306 | * 6/1976 | Martin | 359/379 |

FOREIGN PATENT DOCUMENTS

| | | | | |
|---|---|---|---|---|
| 1577490 | * | 8/1969 | (FR) | 359/379 |
| 6-4720 | | 1/1994 | (JP) . | |

* cited by examiner

Primary Examiner—Jon Henry
(74) Attorney, Agent, or Firm—Vorys, Sater, Seymour and Pease LLP (57) ABSTRACT

A microscope is capable of changing over a magnification of an objective lens with a simple construction and by a simple changeover operation without operating a focusing handle when observing a sample within a chamber. The microscope includes an objective lens change unit for holding a plurality of objective lenses and selectively disposing the objective lenses on an observation optical path of the microscope. The objective lens change unit has a first objective lens holding member which holds a first objective lens among the plurality of objective lenses, and a second objective lens holding member which holds a second objective lens a working distance of which is shorter than that of the first objective lens. The first objective lens holding member is fixed to the objective lens change unit. The second objective lens holding member is so provided in the objective lens change unit as to be movable in an optical axis direction of the second objective lens.

21 Claims, 7 Drawing Sheets

MICROSCOPE HAVING ADJUSTABLE OBJECTIVE LENS HOLDER

This application claims the benefit of Japanese Patent Application Nos. 9-261365 and 10-095520 which are hereby incorporated by references.

BACKGROUND OF THE INVENTION

1. Field of the Invention

The present invention relates to a microscope and a microscope observing method.

2. Related Background Art

In the physiological field, living cells and living tissues are often studied by use of a microscope. If an observation object is thick, there is a problem in that a deep part of a sample is hard to observe in term of light transmissibility, whereas an area from an objective-lens-side surface of the sample down to a slightly internal part is readily observable.

According to another technique practiced in the physiological field, an electrode image is observed through operation such as bringing a micro-electrode into contact with a local part of the sample or pricking the local part with the micro-electrode by use of a micro-manipulator. When observed in such a way, the electrode is manipulated with respect to the sample above a container containing the sample. In this case, a good sample image of even a thick sample and an electrode image are to be simultaneously observed, and hence an erecting type of microscope is often used. Further, a sample of a living body maybe immersed into an artificial body fluid contained in a chamber, and is observed through this body fluid.

As the study becomes more complicated, a plurality of micro-manipulators fitted with the micro-electrodes are disposed along the periphery of the objective lens. When setting the micro-electrode, to begin with, rough setting is performed by using a low-magnification dry objective lens (with a magnification on the order of, e.g., 4×, 10×) having a wide field, a long working distance and a large depth of focus. Next, final setting or a local observation are carried out by using a high-magnification immersion objective lens (with a magnification on the order of, e.g., 40×, 60×).

The low-magnification dry objective lens has a long working distance, and therefore a front edge of the objective lens exists upwardly of an edge of the chamber containing the sample. A front edge of the high-magnification immersion objective lens exists, however, in the liquid or in the vicinity of a liquid surface and downwardly of the edge of the chamber.

Accordingly, a problem is that the immersion objective lens impinges upon the edge of the chamber when changing over the magnification. Japanese Utility Model Laid-Open Publication No. 6-4720 discloses a microscope capable of obviating the problem without vertically moving the focusing mechanism. This microscope includes vertical moving mechanisms for making the respective objective lenses movable in the optical axis direction, which are provided between an objective lens exchanging unit and the plurality of objective lenses.

According to the prior art described above, the vertical moving mechanism is provided for each objective lens, and hence the construction is complicated, and can make the changeover operation laborious. Further, when trying to ensure a parfocal state with respect to each objective lens, a working precision of the vertical moving mechanism is highly strict, and a price of the product becomes too high to be realistic.

Moreover, in the case of simultaneously observing both of the sample set on the bottom of the chamber containing liquid (e.g., water) and the micro-electrode fitted to the micro-manipulator, there are used the low-magnification dry objective lens for rough setting and the high-magnification immersion objective lens for a minute observation. The sample and the manipulator are observed by the low-magnification dry objective lens throughout a whole depth of the liquid, and the sample is also observed by the high-magnification immersion objective lens through a fixed level of water (liquid) depth based on a design value.

A problem is presented in a case where the sample (chamber) is replaced and a quantity of the water (liquid) in the chamber changes. For the immersion objective lens, a distance from the lens front edge to the sample is in a focusing state at the fixed water (liquid) depth based on the design value. Accordingly, even when the water (liquid) quantity changes, the quantity of the water into which the objective lens front edge is immersed merely changes, and a distance from the sample position to the objective lens fitting position is fixed.

For the observation through the dry objective lens, on the other hand, the distance from the position of the sample in the focusing state to the objective lens fitting position might change due to a difference in refractive index between the water (liquid) and the air.

Consequently, there arises such a problem that both of the dry objective lens and the immersion objective lens are capable of obtaining the parfocal state only when at a given water (liquid) depth based on the design value.

If the water depth changes by 1 mm, it follows that the focusing position changes by approximately 0.25 mm in the dry objective lens. Accordingly, it is required that a focusing handle be largely rotated as a control quantity of the focusing quantity of the microscope, corresponding to a slight change in the water depth, resulting in being forced to suffer inconvenience. Further, the focusing handle is hard to operate in the state where the plurality of micro-manipulators are disposed along the periphery of the microscope, and it is desired that the, operation of the focusing handle be as small as possible.

SUMMARY OF THE INVENTION

It is a first object of the present invention, which was contrived to obviate the problems described above, to provide a microscope and a microscope observing method that are capable of changing over a magnification of an objective lens with a simple construction and by a simple changeover operation without movably operating a stage or a whole objective lens change unit by a focusing handle when observing a sample in a chamber.

It is a second object of the present invention to provide, in addition to the first object, a microscope and a microscope observing method by which a parfocal state of a plurality of changeable objective lenses is easily obtained.

It is a third object of the present invention to provide, in addition to the first object, a microscope and a microscope observing method by which the parfocal state of the plurality of changeable objective lenses is easily obtained even when a water (liquid) depth in a chamber is smaller than a working distance of an immersion objective lens.

It is a fourth object of the present invention to provide, in addition to the first object, a microscope and a microscope observing method that are capable of avoiding a contact of a front edge of the objective lens with an edge of the chamber.

To accomplish the above objects, according to one aspect of the present invention, a microscope having an objective lens change unit for holding a plurality of objective lenses and selectively disposing the plurality of objective lenses on an observation optical path of the microscope, comprises a first objective lens holding member which holds a first objective lens among the plurality of objective lenses, and a second objective lens holding member which holds a second objective lens a working distance of which is shorter than that of the first objective lens. The first objective lens holding member is fixed to the objective lens change unit, and the second objective lens holding member is so provided in the objective lens change unit as to be movable in an optical axis direction of the second objective lens.

Since the first objective lens holding member is fixed to the change unit, the first objective lens having a the working distance that is comparatively long enough not to require a movement in the optical axis direction when changing over the objective lens can be fitted to the first objective lens holding member. The second objective lens having a comparatively short working distance and requiring the movement in the optical axis direction when changing over the objective lens is attached to the second objective lens holding member. With this arrangement, when changing over the objective lens, it can suffice that the second objective lens holding member is moved in the optical axis direction of the second objective lens, which simplifies the construction and facilitates the changeover operation.

Further, according to a preferable mode of the present invention, the microscope is of an erecting type, and a parfocal state of the second objective lens with the first objective lens is ensured in a lower restricting position of vertical (upward or downward) movements in the optical axis direction.

On an observation optical path of the microscope, a lower limit position of the moving mechanism for vertically moving the second objective lens holding member is set so that a focal point of the first objective lens is coincident with a focal point of the second objective lens. With this setting, there is no necessity for executing a focusing operation even when the objective lens is changed over.

According to a preferable mode of the present invention, the microscope further comprises an adjusting mechanism which makes adjustable the lower restricting position of the second objective lens.

Even when a quantity of the water (liquid) in the chamber containing the sample to be observed may change, there is no necessity for executing the focusing operation when changing over the objective lens once the parfocal state has been compensated by the adjusting mechanism. Further, the construction is such that the vertical moving mechanism for vertically moving the second objective lens holding member serves also as the adjusting mechanism, and therefore the compensation of the parfocal state can be attained with a simple construction.

Moreover, according to a preferable mode of the present invention, a restricting member for defining the lower restricting position of the second objective lens includes an elastic member for allowing the second objective lens to be moved further downward from the lower restricting position by applying an external force.

With this construction, the second objective lens is the immersion objective lens. And-even if the water (liquid) depth in the chamber containing the sample to be observed is smaller than the working distance of the second objective lens, the front edge of the objective lens can be used to pull up the water (liquid) by dint of affinity with the water (liquid). This is accomplished by lowering the second objective lens against the resistance of the elastic member until the front edge of the second objective lens is immersed in the water (liquid) and then slowly returning the second objective lens to the original position (lower restricting position) with the aid of a biasing force of the elastic member. A space between the front edge of the second objective lens and the sample can be thereby filled with the water (liquid).

Moreover, according to a preferable mode of the present invention, the microscope further comprises a moving mechanism which moves the second objective lens holding member in the optical axis direction, and the moving mechanism includes an operation member, a cam groove interlocking with an operation of the operation member, and an engagement member, provided on the second objective lens holding member, and engaged with the cam groove.

The second objective lens holding member is moved by the cam groove along the optical axis direction, and therefore the operation of the operation member can be simplified.

Still further, according to a preferable mode of the present invention, the microscope further comprises a changeover inhibiting mechanism which inhibits the objective lens change unit from changing over the objective lens when the second objective lens is disposed in the vicinity of the lower restricting position.

If the operator could mistakenly change over the objective lens through an operation of the objective lens change unit when the second objective lens is disposed in the vicinity of the lower restricting position, i.e., disposed substantially in a focusing state, the objective lens could impinge upon the chamber, and the objective lens or the chamber could be broken. Such being the case, when the second objective lens is in the lower restricting position, the movement of the objective lens change unit is preferably restricted, as by an engagement of a pin provided on a ring with a groove formed in the focusing member. When the second objective lens is positioned upward, the pin is disengaged from the groove, thereby making the objective lens change unit movable.

Furthermore, according to a preferable mode of the present invention, the plurality of objective lenses are linearly disposed and move in an arraying direction of the objective lenses within a plane intersecting the observation optical axis, thus changing over the objective lens.

Moreover, according to a preferable mode of the present invention, the arraying direction of the objective lenses is a back-and-forth direction with respect to an observer.

DESCRIPTION OF THE PREFERRED EMBODIMENTS

Figure 1:
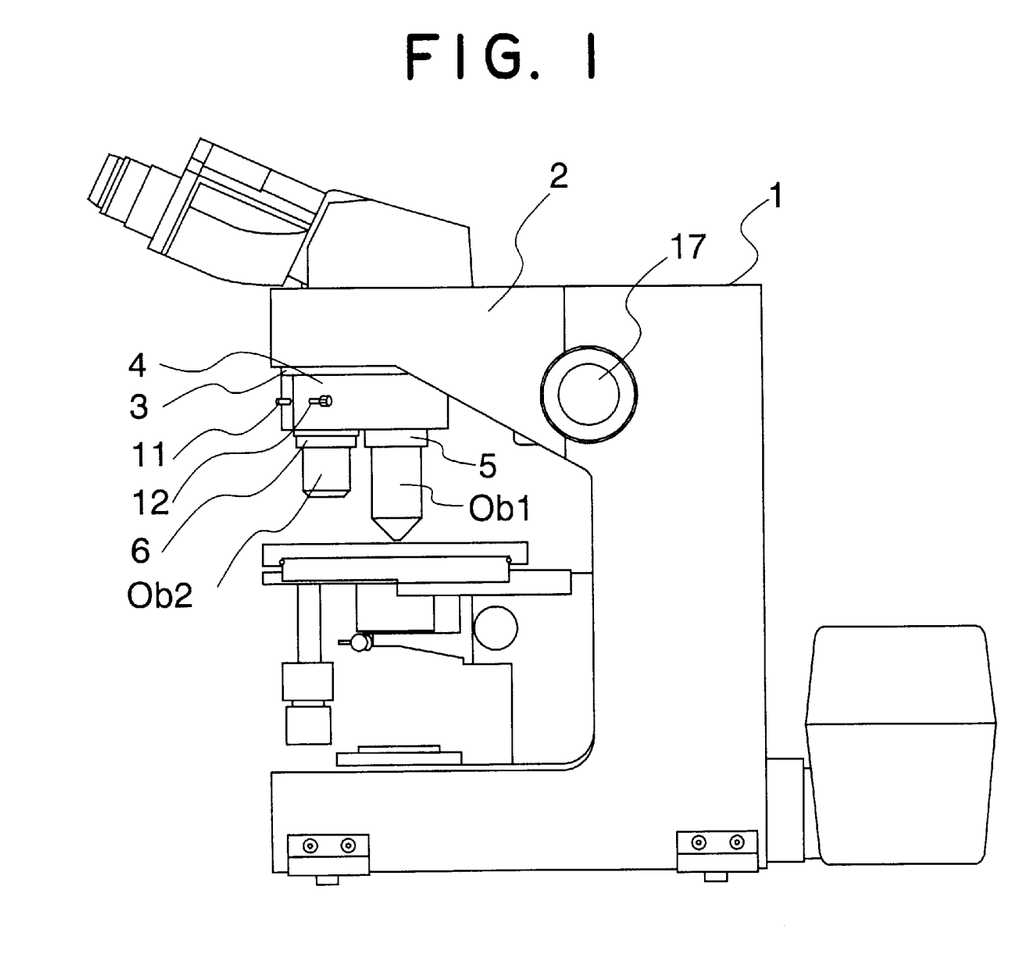
FIG. 1 is a side view showing a microscope in an embodiment of the present invention.

One embodiment of the present invention will hereinafter be described. FIG. 1 is a side view showing a microscope including an objective lens change unit according to the present invention, wherein the numeral 1 designates a microscope, and 2 represents an arm member.

Figure 2:
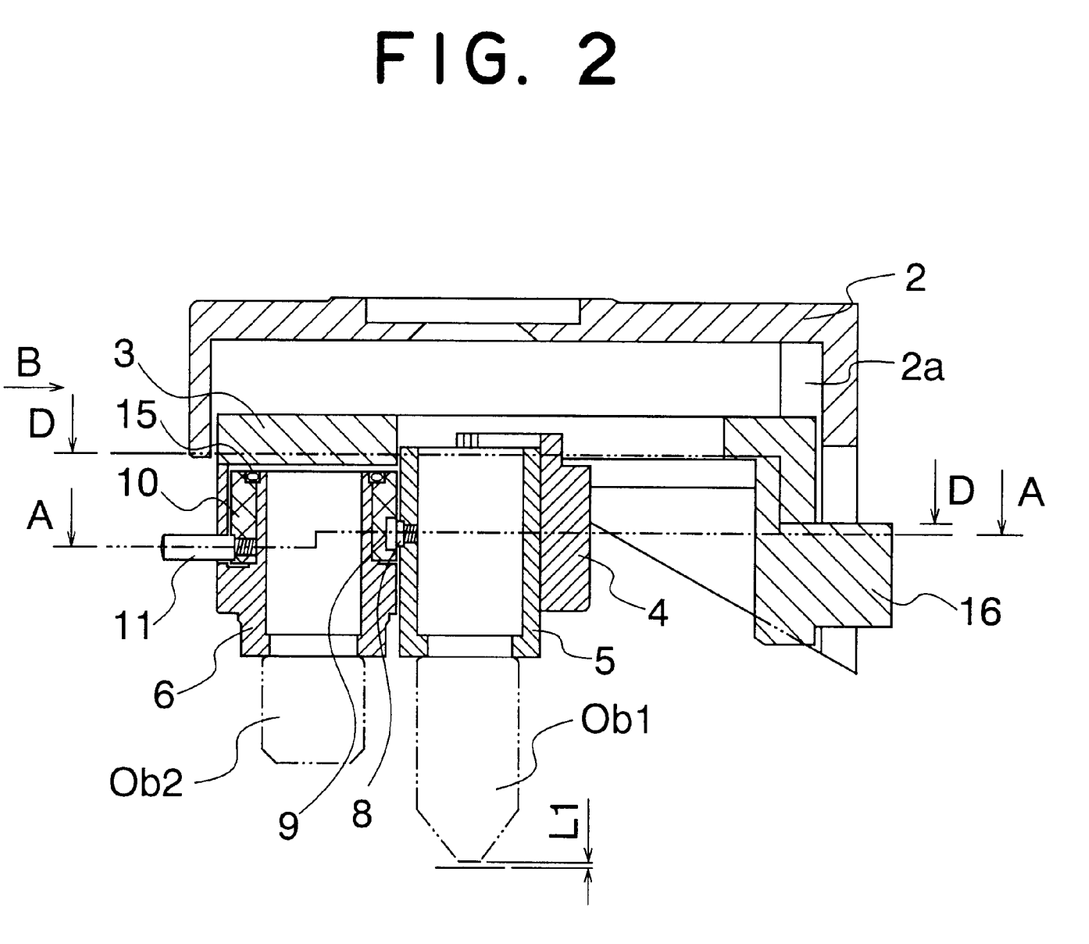
FIG. 2 is a sectional view showing an arm member in the embodiment of the present invention.
Figure 3:
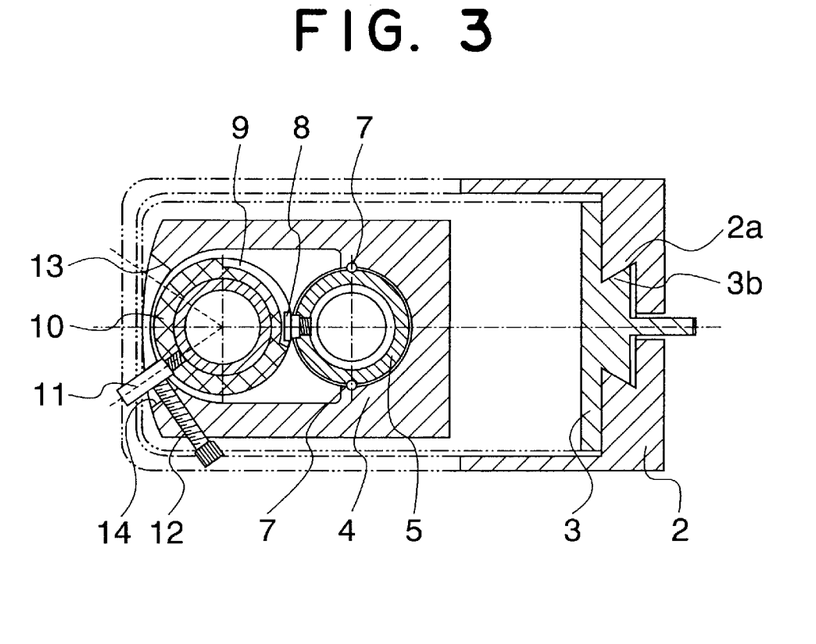
FIG. 3 is a sectional view taken along the line A—A in FIG. 2.
Figure 4:
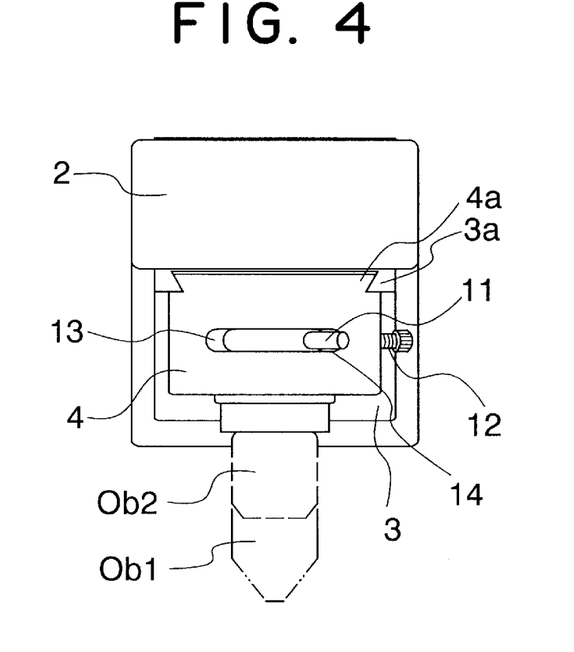
FIG. 4 is a view taken along the arrow line B in FIG. 2.

FIG. 2 is a sectional view showing details of the objective lens change unit provided in the arm member 2. FIG. 3 is a sectional view taken along the line A—A in FIG. 2. FIG. 4 is a view taken along the arrow line B in FIG. 2.

The objective lens change unit includes a focusing member 3 and a horizontal moving member 4 built in recessed portions of the lower surface of the arm member 2. FIG. 2 shows a state where an objective lens ob1 enters an observation optical axis. A male guide 3b of focusing member 3 is fitted in a vertical movement female guide 2a provided inwardly of the arm member 2. A rack 16 provided on the focusing member 3 meshes with an unillustrated pinion gear which is rotated by operating the focusing handle 17 shown in FIG. 1. Accordingly, upon a rotational operation of the focusing handle 17, the objective lens change unit moves up and down, thus performing the focusing operation.

A horizontal movement male guide 4a of a horizontal moving member 4 is fitted in a horizontal movement female guide 3a of the focusing member 3. The horizontal movement member 4 moves so as to slide along these horizontal movement guides 3a, 4a. The objective lens ob1 or ob2 is fixedly positioned on the observation optical axis by an unillustrated positioning click.

An objective lens holder 6 is fixed to the horizontal movement member 4. Further, a linear guide is constructed of a plurality of balls and a V-groove, and an objective lens holder 5 is so held as to be vertically movable in an optical axis direction along this linear guide.

A cylindrical ring 10 is fitted to an outer periphery of the objective lens holder 6. A presser ring 15 for preventing escape of the ring 10 removable is provided at an upper portion of the ring 10. This ring 10 is so provided as to be rotatable about the objective lens holder 6, and a cam groove 9 is formed in its outer peripheral surface. The cam groove 9 engages with a cam shaft 8 screwed into and fixed to the objective lens holder 5. A knob 11, which is screwed into and fixed to the ring 10, protrudes from an aperture portion formed in a front surface of the horizontal movement member 4. This aperture portion includes rotation restrictions 13, 14, and the ring 10 rotates between these rotation restrictions.

A screw 12 is screwed into the horizontal movement member 4, and a tip of the screw 12 can be protruded from the rotation restriction 14. Further, a protrusion quantity from the rotation restriction 14 is changeable. As shown in FIG. 3, when the tip of the screw 12 is protruded from the rotation restriction 14, this tip functions as rotation restriction of the knob 11. With this construction, a restricting position can be simply controlled.

The symbol ob1 designates a high-magnification immersion objective lens for a minute observation. This lens attached to the vertically movable objective lens holder 5. The symbol ob2 represents a low-magnification dry objective lens for rough positioning, and this lens attached to the fixed objective lens holder 6. In this embodiment, the high-magnification immersion objective lens ob1 is shorter in working distance than the low-magnification dry objective lens ob2.

Figure 5:
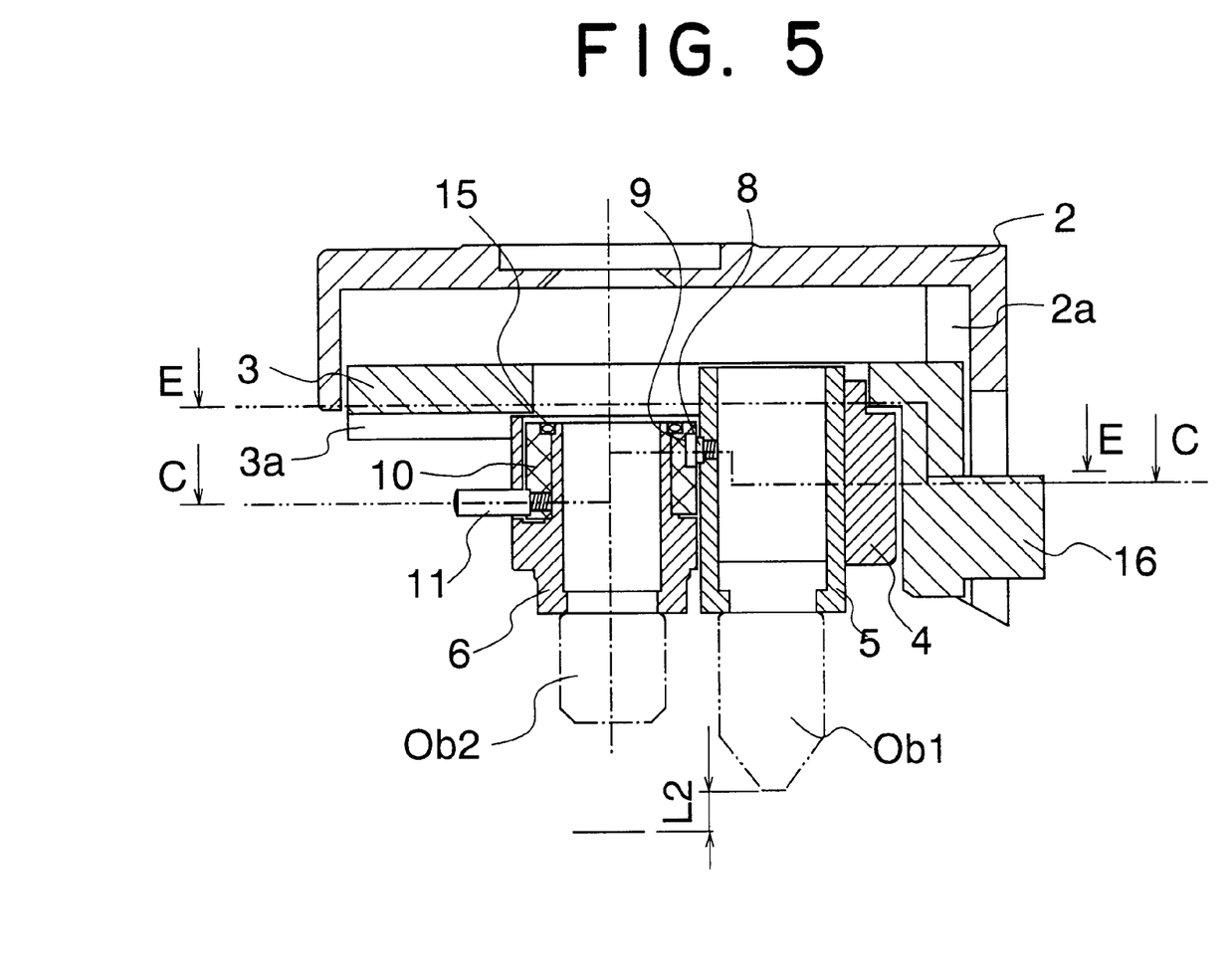
FIG. 5 is a sectional view illustrating the arm member in the embodiment of the present invention.
Figure 6:
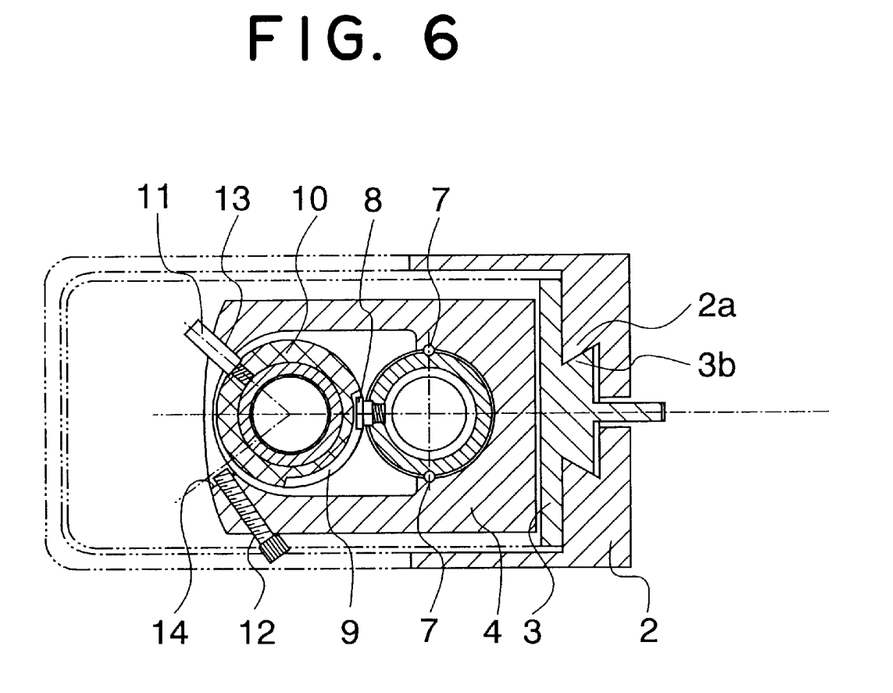
FIG. 6 is a sectional view taken along the line C—C in FIG. 5.
Figure 7:
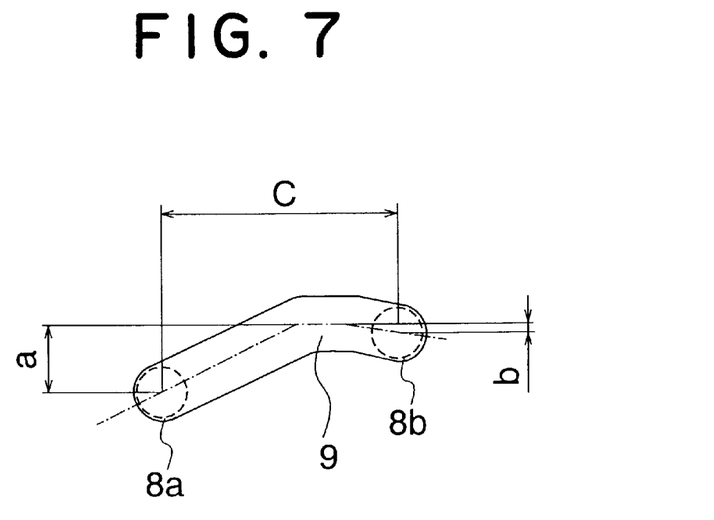
FIG. 7 is a developmental view showing a cam groove 9.

FIG. 5 shows a state where the horizontal movement member 4 moves from the position in FIG. 2 and the low-magnification dry objective lens ob2 enters the observation optical axis. FIG. 6 is a sectional view taken along the line C—C in FIG. 5. FIG. 7 is a developed enlarged view of the cam groove 9. The same members as those shown in FIGS. 2 and 3 are marked with the like numerals, and further explanations thereof are omitted.

As shown in FIG. 7, the cam groove 9 takes a crest shape, ends of which have height positions different from each other. As illustrated in FIGS. 2 and 3, when the knob 11 is on the side of the rotation restriction 14, the cam shaft 8 exists in a position 8a shown in FIG. 7. When the knob 11 is rotated toward the rotation restriction 13 from this state, the objective lens holder 5 is first raised by a stroke a from a lower restricting position of the cam groove 9. In further approaching an upper restricting position, the objective lens holder 5 descends by a stroke b from the highest position and becomes stable. As shown in FIGS. 5 and 6, when the knob 11 is moved to the side of the rotation restriction 13, the ring 10 rotates, and the cam shaft 8 is disposed in a position 8b shown in FIG. 7.

Since both of the lower restriction side and the upper restriction side of the cam groove 9 descend, the cam shaft 8 is located in the respective restricting positions by the weights of the objective lens ob1 and of the objective lens holder 5. Accordingly, the objective lens ob1 stops in a vertical position in a stable state without a need for any special fixing mechanism. Further, the objective lens ob1 can be moved up and down simply by reciprocating the knob 11 between the rotation restrictions 13, 14. Further, the vertical movement of the objective lens ob1 can be done independently of the vertical movement of the focusing member 3 as well as of the horizontal movement of the horizontal movement member 4.

In the construction described above, when observing a sample in a chamber containing water, the microscope is operated in accordance with the procedures which follow.

To start with, the horizontal movement member 4 is moved, and the low-magnification dry objective lens ob2 is set on the observation optical axis. In this case, the knob 11 rotates toward the rotation restriction 13, and front edge of the high-magnification immersion objective lens ob1 is raised up to a position L2 from the sample (FIG 5). In this state, the sample is focused by the focusing handle 17, and a micro-manipulator is set.

Next, the high-magnification immersion objective lens ob1 is set on the observation optical axis by moving the horizontal movement member 4. Thereafter, the knob 11 is rotated toward the lower restriction 14, and the immersion objective lens ob1 is lowered, thus setting an observable state (FIGS. 2 and 3).

If a depth of the water within the chamber is different from a working distance of the immersion objective lens, a parfocal state is lost with respect to the dry objective lens and the immersion objective lens, and hence an in-focus state is obtained by adjusting a position of the lower restriction by moving the screw 12 in or out. In this case, the focusing handle 17 need not be operated.

With this arrangement, even if the water depth (quantity) within the chamber changes when replacing the chamber, a focal point of the objective lens ob1 is adjusted to a focal point of the objective lens ob2, whereby the parfocal state is always kept even when changing the objective lens over.

With the construction and operations described above, the invention provides a microscope capable of changing over a magnification of the objective lens in such a manner that the parfocal state is ensured between the low-magnification dry objective lens and the high-magnification immersion objective lens, even when the water depth in the chamber varies and without interfering with the chamber and the micromanipulator thereabout. At the same time, the microscope exhibits an excellent operability with a reduced operation frequency of the focusing handle.

Further, the parfocal compensating mechanism is provided for the immersion objective lens ob1 required to be moved up and down, and hence the respective functions thereof can be performed with a simple construction.

Next, a modified example of the screw 12 for defining the lower restricting position of the immersion objective lens ob1 will be explained with reference to FIG. 8.

Figure 8:
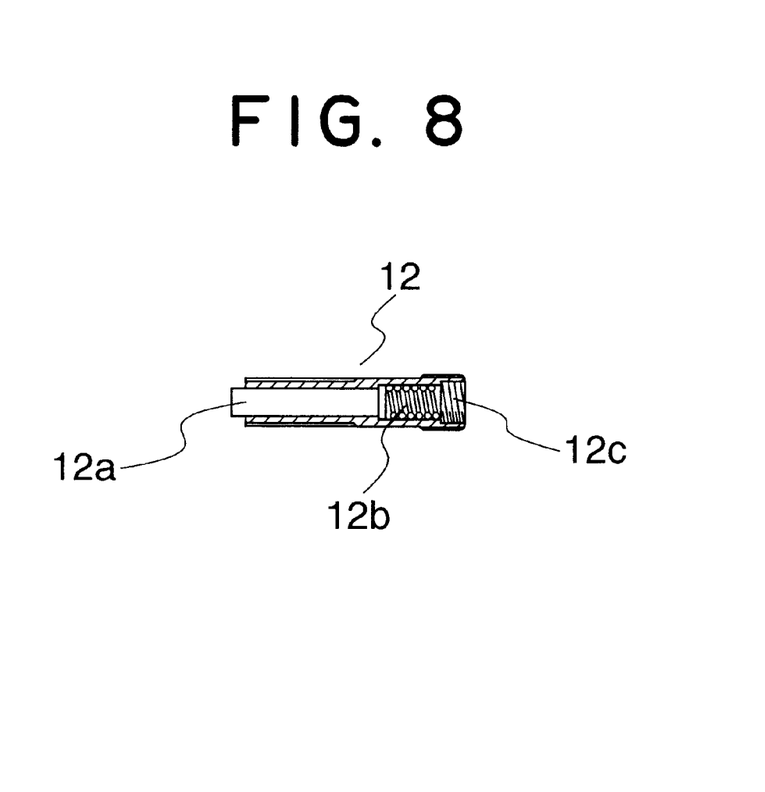
FIG. 8 is a view showing a modified example of a screw 12.

As shown in FIG. 8, a tip 12a of the screw 12 is elastically protruded by a spring 12b, constituting an elastic member, and a receiving member 12c, the structure being such that the tip is contracted (retracted) when applying a strong force to the tip 12a. The elastic force of this spring 12b is larger than a force by which the knob 11 pushes the tip 12a due to the weights of the objective lens ob1 and of the objective lens holder 5. With the normal changeover operation of the objective lens, the knob 11 stops in such a position as to contact with the tip 12a. If desired, the spring 12b can be compressed by the operator pushing the knob 11 against the tip 12a, with the result that the objective lens ob1 descends below the lower restricting position.

Figure 9A:
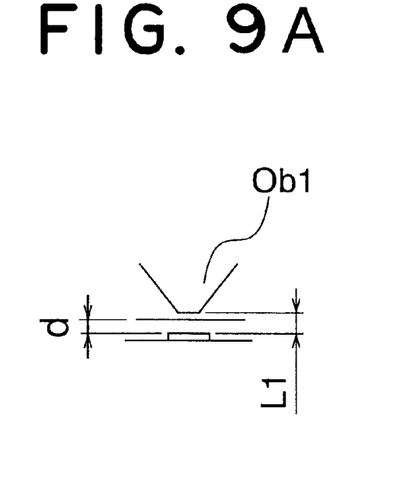
FIG. 9A is an explanatory diagram showing a case where a water immersion is shallower than a working distance of an immersion objective lens.
Figure 9B:
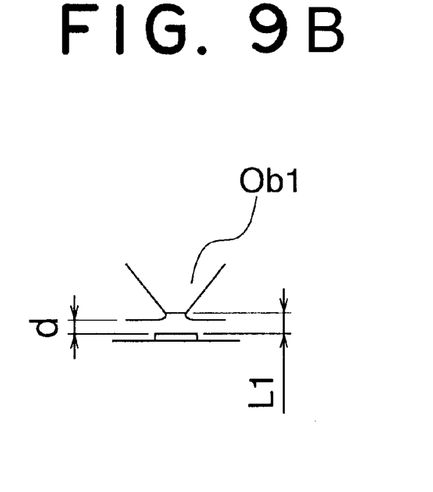
FIG. 9B is a diagram showings an in-focus state in FIG. 9A.

With such a construction, as illustrated in FIG. 9A, even when the water depth from the sample within the chamber is smaller than the working distance L1 of the objective lens ob1, the objective lens ob1 can be descended under the lower restricting position by pushing the knob 11 against the screw 12. Then, after making the front edge of the objective lens touched on the water in the chamber, the force applied to the knob 11 is eliminated, at which time the objective lens pulls the water up by dint of affinity of the objective lens with the water. FIG. 9B shows a state at that time. Thus, this modified example exhibits in addition to the effect in the embodiment discussed above such an effect that the parfocal state can be simply adjusted without operating the focusing handle 17 even when the water depth in the chamber is smaller than the working distance of the objective lens.

Figure 10:
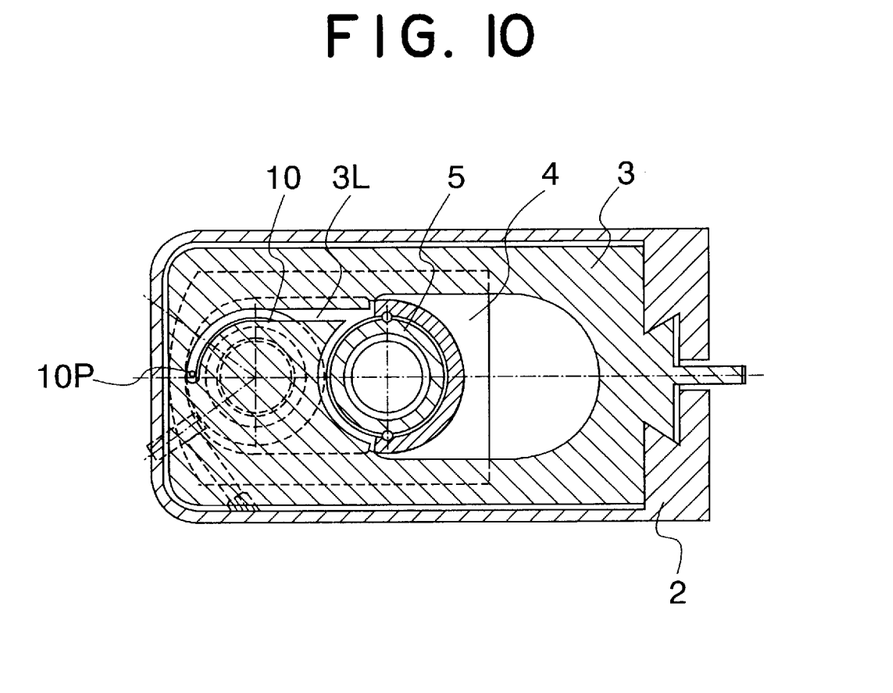
FIG. 10 is a sectional view taken along the line D—D in FIG. 2, showing a modified example of the present invention.
Figure 11:
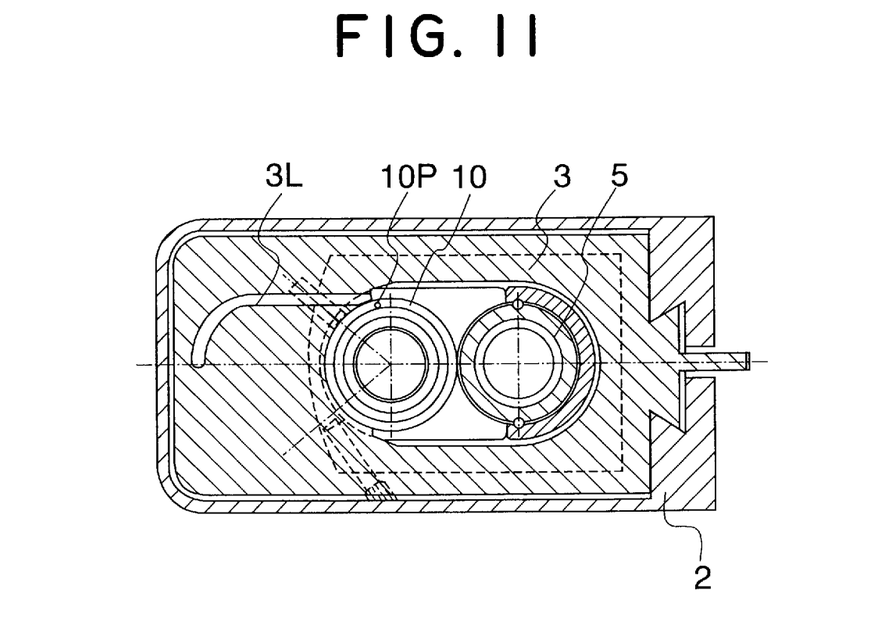
FIG. 11 is a sectional view taken along the line E—E in FIG. 5, showing a modified example of the present invention.

Next, there will be described referring to FIGS. 10 and 11 a modified example in which a changeover inhibiting mechanism is additionally provided between the focusing member 3 and the horizontal movement member 4. FIG. 10 is a sectional view taken along the line D—D in FIG. 2. FIG. 11 is a sectional view taken along the line E—E in FIG. 5. Referring to FIGS. 10 and 11, the same members as those shown in FIGS. 2 and 5 are marked with the same numerals.

A groove 3L is formed in the lower surface of the focusing member 3, and the ring 10 fitted to the objective lens holder 6 is provided with a pin 10P engaging with the groove 3L. The groove 3L extends substantially in a J-shape downwards (towards the observer) from an aperture, formed in the vicinity of the optical path of the microscope, of the focusing member 3.

As illustrated in FIG. 10, when the objective lens holder 5 (the objective lens ob1) exists in the vicinity of the lower restricting position, the pin 10P is disposed at a central portion of the horizontal movement member 4 in the widthwise direction. Accordingly, the pin 10P is restricted in terms of its movement in back-and-forth directions (in the right-and-left directions in FIG. 10) with respect to the groove 3L, and in this state the horizontal movement member 4 is unmovable with respect to the focusing member 3. This is also the same in a case where the objective lens holder 5 is not, as shown in FIG. 11, disposed on the optical path of the microscope.

As shown in FIG. 11, when the objective lens holder 5 (the objective lens ob1) exists upward, the pin lop is disposed at a side portion of the horizontal movement member 4 in the widthwise direction. Accordingly, the pin lop is movable in the back-and-forth directions (in the right-and-left directions in FIG. 11) with respect to the groove 3L, and the horizontal movement member 4 is movable with respect to the focusing member 3.

With the construction described above, the objective lens can not be changed over when the objective lens ob1 is the lower restricting position, and therefore it is possible to avoid a contact between the front edge of the objective lens and the edge of the chamber, whereby the objective lens and the chamber can be protected The configuration of the groove 3L is not limited to the J-shape but may be, e.g., a C-shape.

In the embodiments and the modified examples discussed above, an arrangement with a two objective lenses has been explained; however, there may be three or more objective lenses. In this case, a construction may be such that the objective lens holders corresponding to the respective objective lenses are provided, and the objective lens holders movable in the optical axis direction are so connected as to integrally move in the optical axis is direction. Further, if the cam structure is changed, the positions of the fixed objective lens holder and of the movable objective lens holder can be easily reversed.

Also, the objective lens change unit of the microscope in the illustrative forms discussed above is a mechanism for changing over the objective lens through a horizontal movement. The present invention is not, however, limited to such a construction and may adopt a construction in which the objective lens is changed over through a rotational movement and a circular arc rotation.

According to the present invention, when observing the sample within the chamber, the magnification of the objective lens can be changed with a simple construction and by a simple operation without movably operating the stage or the whole objective lens change unit by use of the focusing handle of the stage.

According to a preferable mode of the present invention, when changing over the magnification of the objective lens, the parfocal state of the plurality of changeable objective lenses is easily obtained without movably operating the stage or the whole objective lens change unit by use of the focusing handle.

According to a preferable mode of the present invention, there is no necessity for executing the focusing operation when the objective lens is changed over once the parfocal state has been compensated with the adjusting mechanism, even if the water (liquid) quantity in the chamber containing the sample to be observed may change. Further, because the vertical movement mechanism for vertically moving the second objective lens holding member is so constructed as to serve as the adjusting mechanism, the compensation of the parfocal state can be attained with a simple construction.

Moreover, according to a preferable mode of the present invention, even if the water depth in the chamber is smaller than the working distance of the second objective lens, the front edge of the objective lens can be immersed in the water.

Furthermore, according to a preferable mode of the present invention, since the second objective lens holding member is moved along the optical axis direction by the cam groove, and therefore the operation of the operating member is simplified.

Still further, according to the preferable mode of the present invention, when the second objective lens exists in the vicinity of the lower restricting position, the objective lens can not be changed over, and the objective lens or the chamber can be protected.

What is claimed is:

1. A microscope comprising:
    an objective lens change unit to which a plurality of objective lenses are attachable and which disposes said objective lenses selectively on an observation optical path of said microscope;
    a first objective lens holding member which holds a first of said objective lenses to said objective lens change unit;
    a second objective lens holding member which holds a second of said objective lenses to said objective lens change unit, a working distance of said second objective lens being shorter than that of said first objective lens;
    an objective lens moving mechanism which moves at least one of said first and second objective lenses relative to said objective lens change unit in an optical axis direction of said one objective lens;
    at restricting member carried by said change unit and disposed in a movement path of a movable member of said moving mechanism to engage said movable member and thereby restrict said one objective lens from moving beyond a closest approach position thereof to an observation sample relative to said change unit; and
    an adjusting mechanism which adjusts a position of said restricting member relative to said movement path to change said closest approach position relative to said change unit.

2. A microscope according to claim 1, wherein said adjusting mechanism is operative to establish a parfocal state between said first objective lens and said second objective lens with adjustment of the position of said restricting member.

3. A microscope according to claim 1, wherein said restricting member includes an elastic member which allows said one objective lens to be resiliently moved closer to the sample from said closest approach position in response to an external force.

4. A microscope according to claim 1, wherein said objective lens moving mechanism includes an operation member, a cam movable with an operation of said operation member, and an engagement member provided on at least one of said first objective lens holding member and said second objective lens holding member and engaged with said cam.

5. A microscope according to claim 1, further comprising:
    a changeover inhibiting mechanism which inhibits said objective lens change unit from changing over said one objective lens when said one objective lens is disposed close to said closest approach position.

6. A microscope according to claim 1, wherein said plurality of objective lenses are linearly disposed on said objective lens change unit so as to be movable in an arraying direction of said plurality of objective lenses, within a plane intersecting an observation optical axis, in order to change over the objective lens on said observation optical path.

7. A microscope according to claim 6, wherein the arraying direction is a back-and-forth direction with respect to an observer.

8. A microscope according to claim 1, wherein said objective lens moving mechanism moves said second objective lens relative to said objective lens change unit in an optical axis direction of said second objective lens.

9. A microscope observing method using a microscope having an objective lens change unit to which a plurality of objective lenses are attachable and which disposes said plurality of objective lenses selectively on an observation optical path of said microscope, a first objective lens holding member which holds a first of said objective lenses to said change unit, and a second objective lens holding member which holds a second of said objective lenses to said objective lens change unit, a working distance of said second objective lens being shorter than that of said first objective lens, said method comprising:
    moving at least one of said first and second objective lenses relative to said change unit in an optical axis direction of said one objective lens;
    stopping said one objective lens at a closest approach position thereof to an observation sample relative to said change unit by bringing a movable member that imparts movement to said one objective lens relative to said change unit into engagement with a restricting member carried by said change unit and disposed in a movement path of said movable member; and
    adjusting said closest approach position relative to said change unit by adjusting a position of said restriction member relative to said movement path.

10. A microscope observing method according to claim 9, wherein said adjusting establishes a parfocal state between said first objective lens and said second objective lens.

11. A microscope observing method according to claim 9, further comprising:
    causing said one objective lens to move closer to the sample from said closest approach position by applying an external force; and
    returning said objective lens to said closest approach position by removing the external force.

12. A microscope comprising:
    an objective lens change unit to which a plurality of objective lenses are attachable and which disposes said plurality of objective lenses selectively on an observation optical path of said microscope;
    an objective lens moving mechanism which moves at least one of said objective lenses relative to said objective lens change unit in an optical axis direction of said one objective lens; and
    a changeover inhibiting mechanism which inhibits said change unit from changing over the objective lens disposed on said observation optical path in a state where said one objective lens is substantially at a closest approach position thereof to an observation sample relative to said change unit.

13. A microscope comprising:
- an objective lens change unit to which a plurality of objective lenses are attachable and which disposes said plurality of objective lenses selectively on an observation optical path of said microscope;
- an immersion objective lens held by said objective lens change unit;
- a restricting member which defines a closest set position of said immersion objective lens to an observation sample relative to said objective lens change unit; and
- an elastic member disposed between said immersion objective lens and said objective lens change unit so as to permit said immersion objective lens to move relative to said objective lens change unit toward the sample from said closest set position in response to an applied external force and to return said immersion objective lens to said closest set position in response to removal of the external force.

14. A microscope comprising:
- an objective lens change unit to which a plurality of objective lenses are attachable and which disposes the plurality of lenses selectively on an observation optical path of the microscope;
- a first objective lens which is fixedly held by said objective lens change unit among said plurality of objective lenses;
- a second objective lens which is adjustably movable relative to said objective lens change unit along an optical axis of said second objective lens and which is held by said objective lens change unit among said plurality of objective lenses;
- an objective lens moving mechanism which moves said second objective lens relative to said objective lens change unit throughout a predetermined range between an upper restricting position and a lower restricting position along the optical axis of said second objective lens, the lower restricting position being defined by an adjustably positioned restricting member; and
- a parfocal adjusting mechanism which is adjustable to change the position of said restricting member to provide a parfocal state between said first objective lens and said second objective lens when said second objective lens is disposed on the observation optical path by said objective lens change unit.

15. A microscope according to claim 14, wherein said first objective lens is a low-magnification dry objective lens with a long working distance, and said second objective lens is a high-magnification immersion objective lens with a relatively short working distance.

16. A microscope according to claim 14, wherein said objective lens moving mechanism comprises an external operating member, a driving member movable by applying force to said external operating member, and a driven member moved by movement of said driving member.

17. A microscope according to claim 16, wherein said driving member is a ring having a cam which is engaged with a lens holder of said first objective lens, said external operating member is an operating lever which is fixed to said ring so that force can be applied to said operating lever to rotate said ring, and said driven member is a cam shaft which is fixed to a lens holder of said second objective lens and which is engaged with said cam.

18. A microscope according to claim 15, wherein said objective lens moving mechanism includes an elastic member which can be forced to move said immersion objective lens further downward from the lower restricting position along the observation optical path.

19. A microscope observing method using a microscope having an objective lens change unit which holds a plurality of objective lenses and disposes said objective lenses selectively on an observation optical path of said microscope, said objective lenses including a first objective lens which is fixedly held by said objective lens change unit and a second objective lens which is movable relative to said objective lens change unit between a first position and a second position along an optical axis of said second objective lens, the second position being defined by an adjustably located restricting member, a working distance of said second objective lens being shorter than that of said first objective lens, said method comprising:
- disposing said first objective lens on the observation optical path by said objective lens change unit;
- focusing said first objective lens on an observation sample;
- changing said first objective lens to said second objective lens by said objective lens change unit so as to dispose said second objective lens on the observation optical path; and
- adjusting the location of said restricting member to adjust said second position of said second objective lens to a parfocal position with respect to said first objective lens.

20. A microscope observing method according to claim 19, wherein said focusing includes vertical movement of a stage of said microscope, and said adjusting vertically shifts said second position with respect to said objective lens change unit.

21. A microscope observing method according to claim 19, further comprising moving said second objective lens further downward from said parfocal position and returning said second objective lens to said parfocal position.

* * * * *